United States Patent Office 3,403,211
Patented Sept. 24, 1968

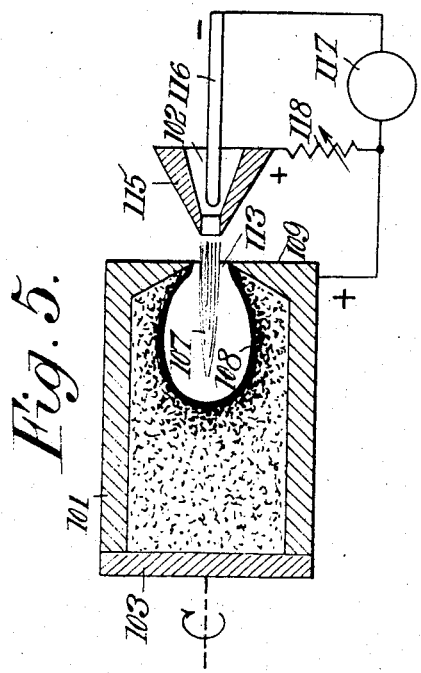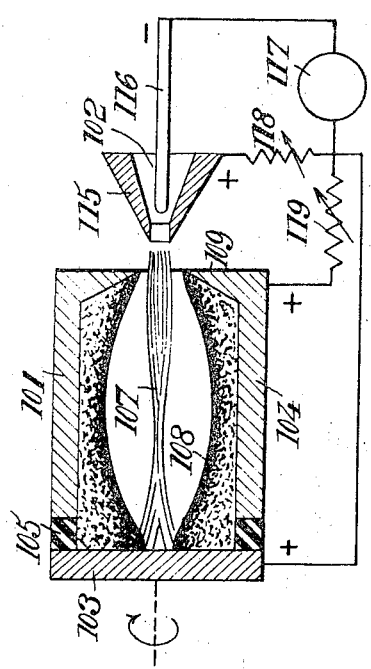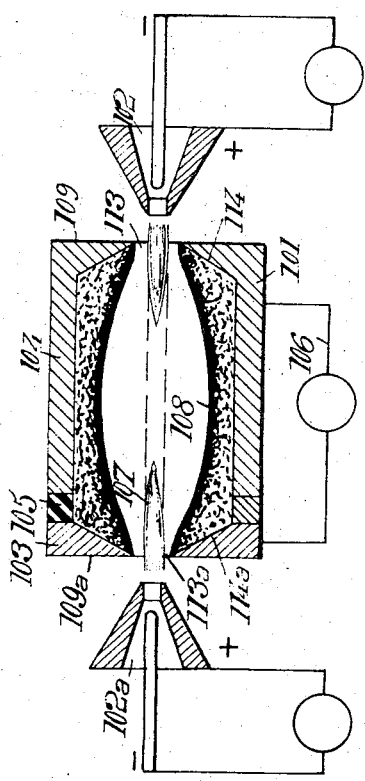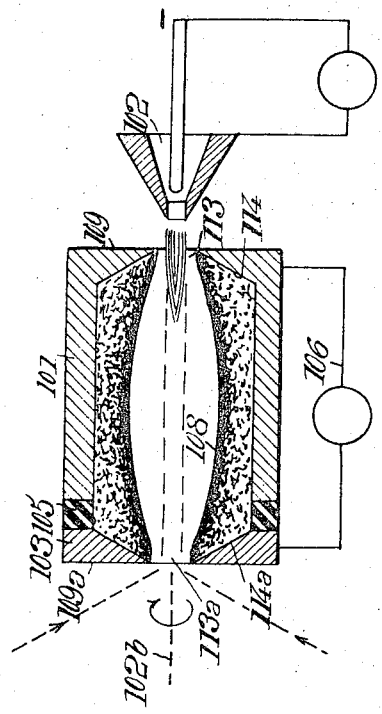

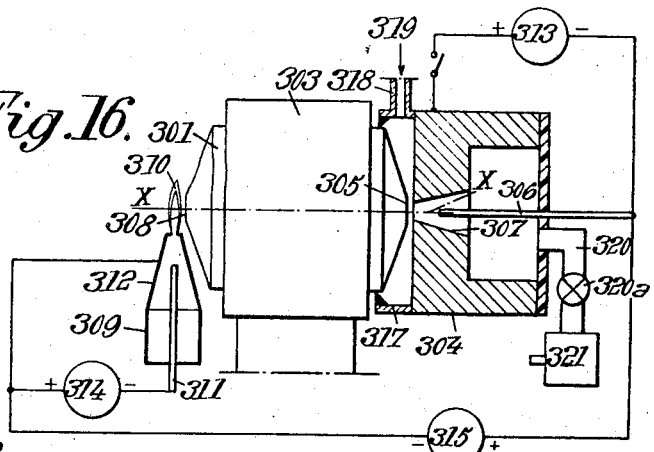
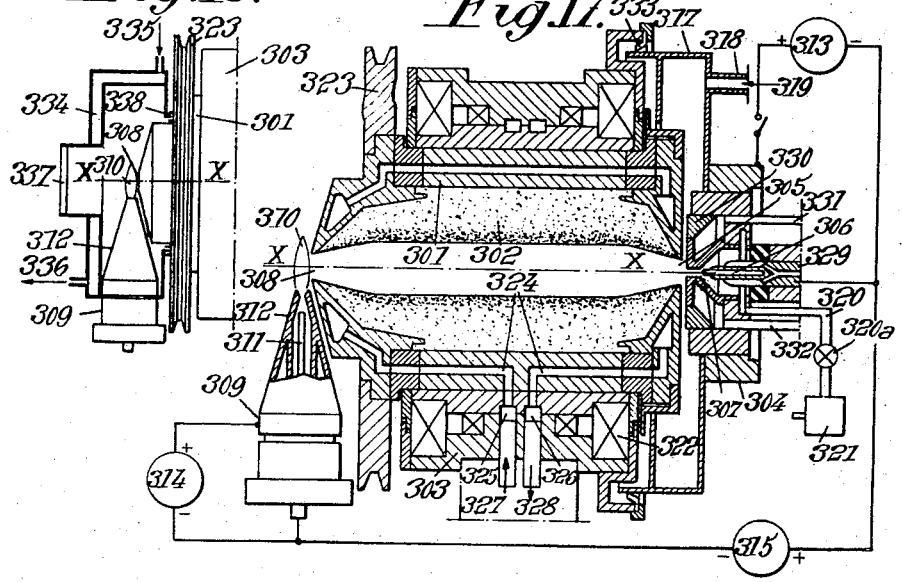
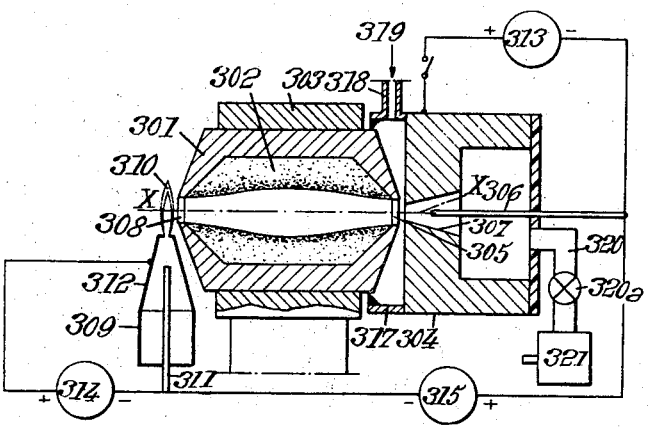

3,403,211
METHODS AND DEVICES FOR
HEATING SUBSTANCES
Marc Foex, Paris, France, assignor to Centre National
de la Recherche Scientifique, Paris, France
Original application Mar. 31, 1965, Ser. No. 444,206, now
Patent No. 3,286,012, dated Nov. 15, 1966. Divided and
this application Aug. 15, 1966, Ser. No. 572,342
Claims priority, application France, Apr. 11, 1963,
931,314; Apr. 3, 1964, 969,702; June 3, 1964,
976,833
14 Claims. (Cl. 13—1)

This application is a division of U.S. application S.N. 444,206, filed Mar. 31, 1965, now patent No. 3,286,012 issued Nov. 15, 1966, which is itself a continuation-in-part of U.S. application S.N. 311,421 filed by the present applicant on Sept. 25, 1963 now patent No. 3,300,561, issued Jan. 24, 1967.

High energy illumination radiations supplied by various types of apparatus, such as sun furnaces and image furnaces essentially permit condensed substances (i.e. solid or liquid substances) capable of absorbing the incident radiation either directly or by successive reflections to be heated to a high temperature. This kind of apparatus is particularly well adapted to the melting of substances while preventing them from becoming contaminated. It is much more difficult to heat gases or vapors in this way because they are not generally good radiation absorbers. However it is possible to heat materials in these states by means of thermal exchanges on hot walls or surfaces located in the focal zone, but the efficiency of such processes is generally low, especially when it is desired to heat the gases to a high temperature approaching that of the wall.

On the other hand, plasma apparatus such as plasma blowpipes directly heat the gases to very high temperatures, higher than the boiling points of the most refractory substances, but it is often rather difficult to use them with a good efficiency for heating condensed substances.

The above-mentioned copending application discloses arrangements for combining the advantages of the two above-mentioned methods. It is essentially characterized by the fact that use is simultaneously made of plasmas and of high energetic illumination radiations to bring to a high temperature, solid, liquid or gaseous substances. The advantages of such mixed heating methods are fully described in said copending application.

The present invention relates to improvements in furnaces for carrying out such heating operations, and in particular to improvements in furnaces comprising, on the one hand, a centrifugal chamber containing the materials to be treated, such as refractory materials which are electrically non-conductive at ordinary temperature, these materials originally being preferably of a powdery or granular form, and, on the other hand, high temperature heating means located close to the inlet, which is preferably axial, of said centrifugal chamber, such means consisting in particular of sun or image furnaces combined with plasma blowpipes.

Such furnaces may be for instance of the type disclosed in United States patent application Ser. No. 240,251 filed by the present applicant on Nov. 27, 1962 for "Improvements in Heating Devices Making Use of Plasma Torches and in Corresponding Methods," new Patent No. 3,257,196 issued June 21, 1966. They may also be of any other suitable type.

It has been noted that mixed heating means of the above-described type, which serve first to heat the materials to be treated to a high temperature, then to keep them at this temperature, have the drawback of creating, in said chambers, a zone of high temperature only in the proximity of the inlet thereof.

Such an arrangement has for its consequence, on the one hand, a considerable loss of thermal energy on the outside of said chamber, and, on the other hand, a sometimes unfavorable distribution of the energy that is recuperated on the inside of the chamber.

Such devices also have the drawback of being incapable of treating certain materials requiring a special atmosphere because the chambers in which the heating takes place are exposed to the surrounding air and because the plasma jet itself transfers certain impurities from the walls of the blowpipe to the material contained in the chamber.

It is a general object of this invention to overcome, or greatly diminish the effects of the above-noted drawbacks.

According to one feature of the present invention, there are provided, in association with a furnace, of the type mentioned above, having a chamber containing the material to be treated and heating means located on the outside of this chamber, means dividing said chamber into at least two metallic portions separated and insulated from each other by a piece made of a material which is not a conductor of electricity, and means for placing said two metallic portions at different potentials so as to produce a heating electric circuit on the inside of the chamber capable of cooperating with heating means located on the outside of the chamber and even, at high temperature, of replacing them, this electric circuit being closed through gases or vapors heated to a high temperature and partly ionized and/or through the hot molten portion of the material treated which, in its molten state, is made conductive of electricity.

According to still another feature of the present invention, relating to the case where the above-mentioned external heating means associated with the chamber consist of one or several plasma blowpipes, there is provided, between one of the electrodes of the plasma blowpipe and at least one of the portions of the chamber, a connection so that after melting has been started inside the chamber by the action of the internal arc plasma blowpipe, the arc which originally extended between the blowpipe electrodes is partially or completely transferred to the interior of said chamber.

According to another feature of the present invention, devices of the above-described type, which may be equipped with one or more external heating means, such as plasma blowpipes, are arranged to permit the injection of a specially selected gaseous fluid between the blowpipe and the chamber opening, said fluid being brought to a high temperature within said chamber by the arc which has been transferred from the blowpipe to the chamber, said injection of a gaseous fluid being effectuated in order that the material in the chamber can be treated in a controlled atmosphere the composition of which depends on the nature of that material and on the type of treatment to be performed, which composition may be different from that of the gas forming the plasma, which latter gas must be chosen according to criteria governing the proper operation of the blowpipe, it being further invisioned that the supply of plasma gas be substantially reduced, or even completely shut off, after the arc has been transferred to the chamber.

Yet another form which this invention may take is produced by mounting a plasma blowpipe rigidly and in a fluid-tight manner at one end of the chamber, by providing an exhaust path for the gas ejected by the blowpipe, which path is furnished with a fixed extension carrying a unit for closing the path, and by arranging an electrical system which permits at least one end of the arc to be transferred from one of the blowpipe electrodes to at least one portion of the chamber, so that if the operation of the blowpipe is diminished or stopped completely and if the path is closed by means of said closing element, there is produced in the chamber a continuous arc in an isolated medium of optimum composition, the efficiency of heat transfer of the arc thereby being substantially increased.

Still another form of the present invention may be constructed starting with a hollow treatment chamber and a heat source constituted by a principal plasma blowpipe, by furnishing the chamber with a second opening opposite the opening for the blowpipe, by disposing at least one auxiliary blowpipe adjacent this orifice, and finally by providing electrical power circuitry connected between one electrode of said principal blowpipe and the gaseous jet of the auxiliary blowpipe so that, after the heat generated by the principal blowpipe has caused the material in the chamber to begin to melt, an arc may be produced between said one of the principal blowpipe electrodes and said auxiliary blowpipe jet.

Finally, the present invention also involves the combining of a device such as the one described immediately above with an auxiliary system comprising a connector connecting said chamber and said principal blowpipe together in a fluid-tight manner and enclosing a space which communicates with the principal blowpipe outlet and into which is injected a treatment fluid chosen to cause an atmosphere of predetermined composition to exist in said chamber after the arc has been transferred to its final position, and pump means connected to divert at least a portion of said treatment fluid, after said arc has been transferred for the last time, across the principal blowpipe so as to prevent impurities from being drawn from said principal blowpipe into said chamber. It should of course be understood that this arrangement can be applied equally well to any of the previously-described embodiments of the present invention or, for that matter, to any heating device having a chamber for holding material to be heated and means for projecting a heat-delivering fluid into said chamber.

These and other objects, features and advantages, of the present invention will become more readily apparent from the following detailed description of several preferred embodiments of the present invention when taken together with the attached drawings, in which:

FIGS. 3–9 are diagrammatic views of several other embodiments of this invention;

Figure 10:
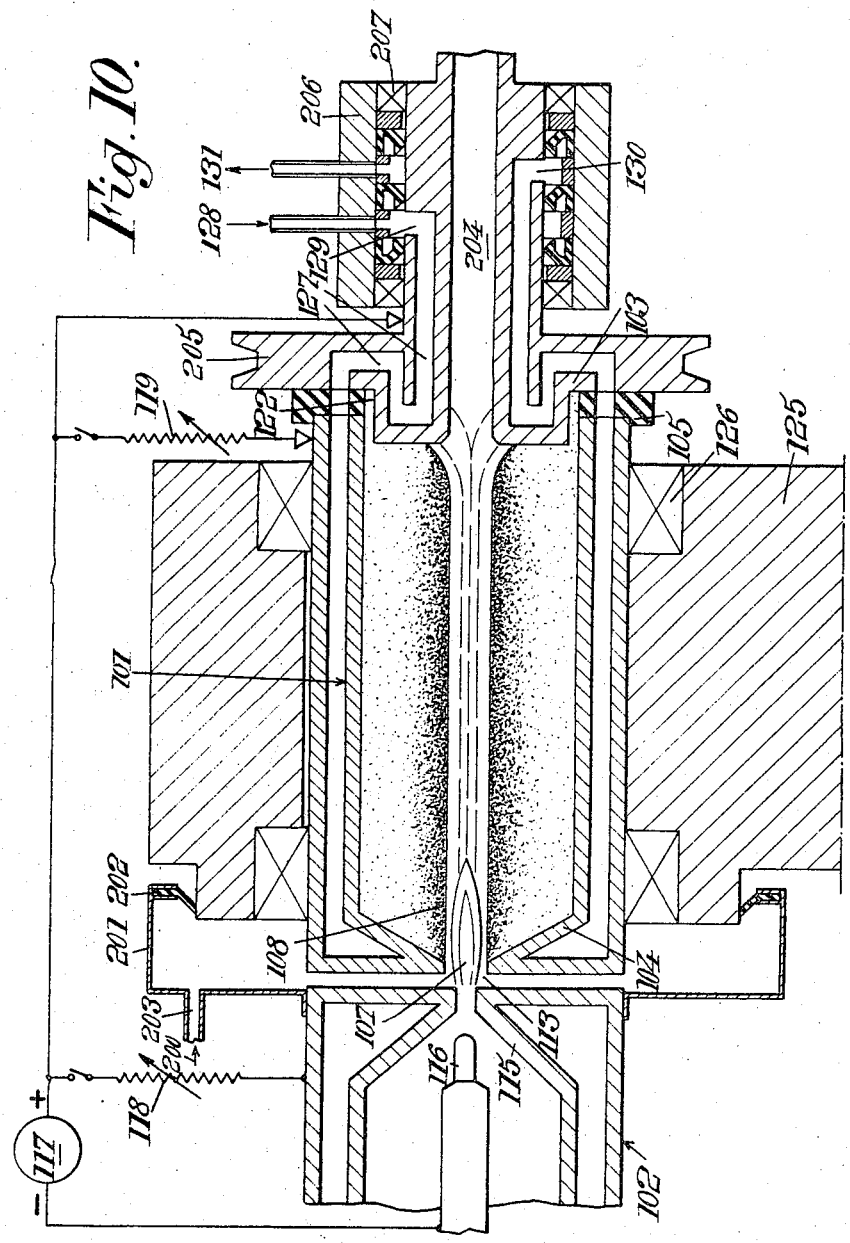
Figure 11:
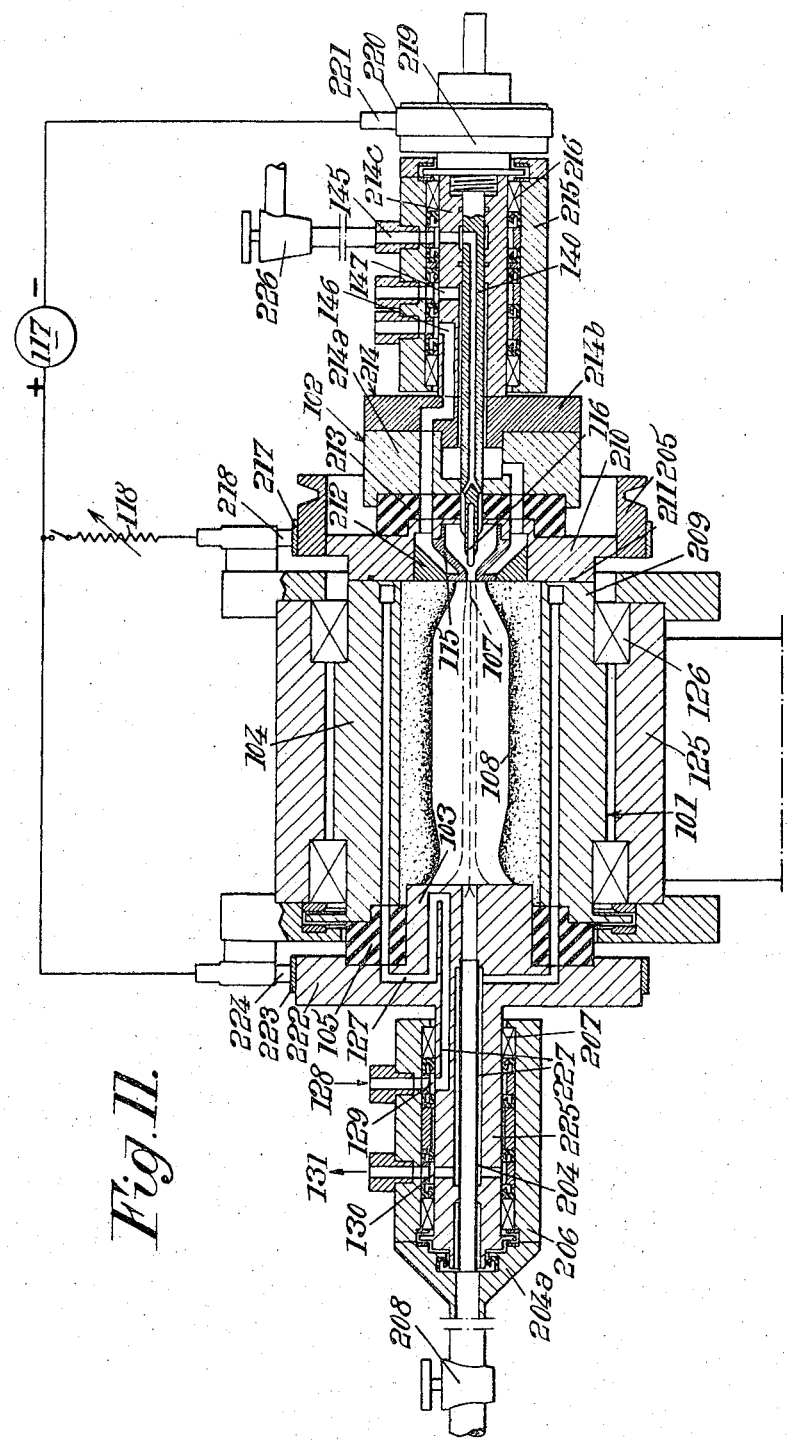

FIGS. 10 and 11 are longitudinal cross-sectional views of two further embodiments of this invention in which means are provided for varying the composition of the atmosphere inside the heating chamber; and FIGS. 12–18 are longitudinal, partially schematic, partially cross-sectional views of still further embodiments of the present invention in which an auxiliary plasma jet is used as a gaseous electrode.

Referring first to FIGS. 1–9, for the treatment at high temperature of materials which are preferably of powdery or granular nature and which are not conductors of electricity, I proceed as follows.

Concerning first the furnace, as a whole, and with the exception of the centrifugal chamber 101 which is to contain the materials to be treated (which as above stated are preferably of powdery or granular nature), it may be made in any suitable manner and in particular include known means for rotating said chamber 101 and heating means 102 on the outside thereof, such as at least one plasma blowpipe or a sun or image furnace.

Figure 1:
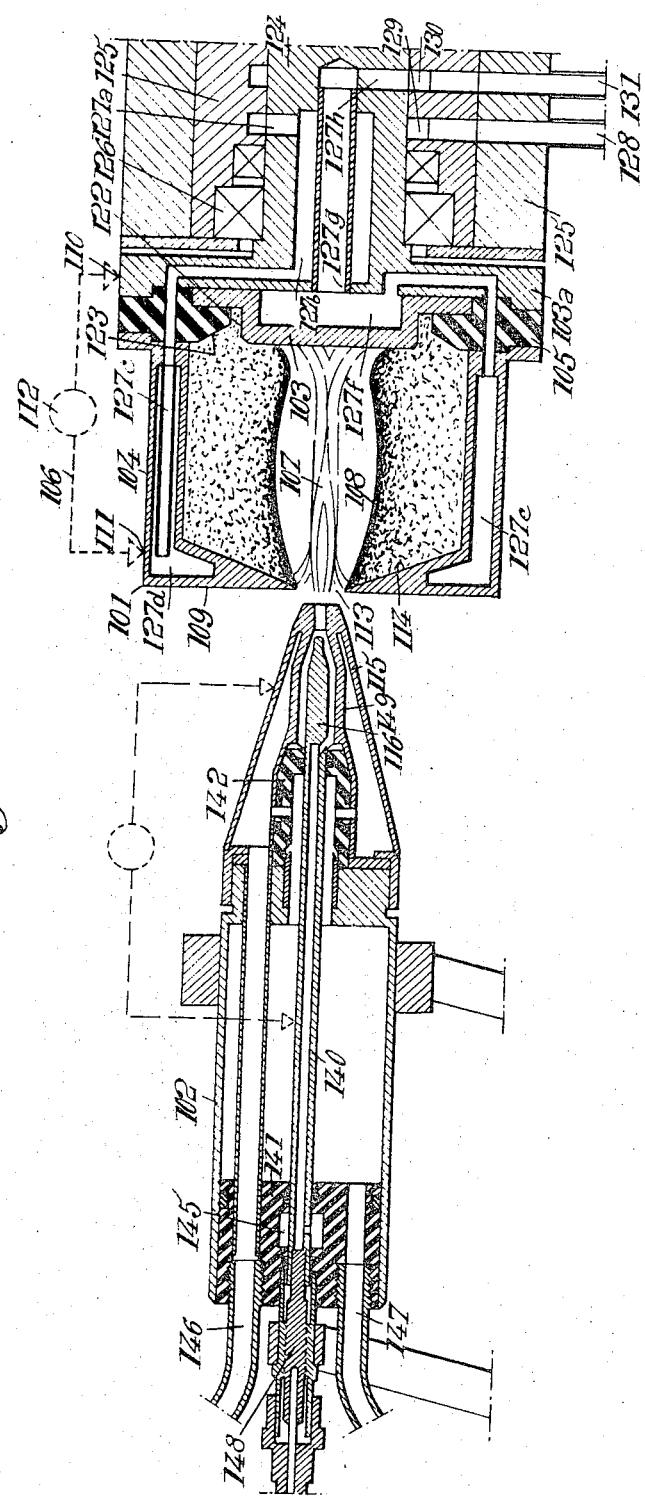
FIG. 1 shows a longitudinal cross-sectional view of one embodiment of the present invention.

Concerning now the chamber itself, it is shown in FIG. 1 to be divided into at least two metal portions 103–103$_a$ and 104 separated and insulated from one another by a piece 105 made of a material which is not a conductor of electricity, and means are provided for placing said metal portions 103 and 104 at different respective potentials in order to form an electric heating circuit 106 completed on the interior chamber 101 and capable of cooperating with heating means 102 located on the outside of chamber 101 and even, possibly at high temperature, of replacing said last mentioned heating means, the closing of this heating circuit 106 being ensured through gases or vapors 107 which are partly ionized at high temperature and/or through the molten portion 108 of the material that is treated, which portion becomes electrically conductive at high temperature.

According to an advantageous feature of the embodiment illustrated in FIG. 1, the end wall 103 of chamber 101 is separated, and electrically insulated, from the cylindrical body 104, which body forms the front wall 109 of said chamber, by an annular part 105 made of a material which is not a conductor of electricity, such as asbestos or a compound of asbestos and a refractory product. Movable contacts permit these portions 103 and 104 to be connected at 110 and 111 respectively, with a generator 112 capable of supplying a direct or alternating current and of bringing these portions 103 and 104 to different respective potentials.

Materials which are generally refractory and electrically non conductive and which are preferably in the powdery or granular state, are packed in a known manner in chamber 101 and subjected to the action of external heating means 102 in the vicinity of the inlet 113 provided in the front wall 109.

Said heating means 102 preferably consist of a plasma blowpipe, which has the advantage not only of being a very good source of heat but also of supplying the very hot and partly ionized gaseous stream 107 which will permit the closing of the above mentioned electric heating circuit 106 when, under the combined actions of the plasma jet and of the centrifugal force, a recess of revolution extending as far as the end wall 103 of chamber 101 is formed in the material treated.

Furthermore, the plasma blowpipe permits, if so desired, the materials in chamber 101 to be treated out of contact with the air and in a selected atmosphere, if the gas which constitutes this atmosphere also constitutes the plasma jet.

It is only when the end wall 103 of chamber 101 is at least partially exposed that current will be capable of passing from portion 104 to said wall 103 through the intermediary of the plasma jet, which current flow will have for the effect of creating a supplementary electric arc in chamber 101 cooperating with the jet from plasma blowpipe 102. I thus obtain a considerable increase of the heating power available inside chamber 101, the main advantage of this increase lying in the great rapidity of treatment of the materials contained in said chamber.

Of course, the cavity of revolution formed in the material by means of the plasma blowpipe 102 might be preestablished in said material in any suitable manner so as to bring, if so desired, the electric arc formed inside chamber 101 more quickly into action.

Other physical phenemenons are brought into play and cooperate in the formation of the supplementary heating electric arc inside chamber 101. These phenomenons, on the one hand, may even replace completely for this purpose the plasma jet, in particular when the heating means on the outside of the chamber comprise, for instance, sun furnaces or image furnaces. On the other hand these phenomenons permit, when the electric arc has been started inside chamber 101, said arc to be maintained while the action of heating means 102 may be reduced and possibly stopped completely.

Thus the layer 108 of molten products which constitutes the inner wall of the cavity formed in the material being treated by the plasma blowpipe 102 (or by any other external heating means) contributes in facilitating the formation of the electric arc inside the chamber. If the refractory materials are not conductors of electricity at ordinary temperature, most of them become conductive in the vicinity of their melting point.

Concerning the inner wall 114 of the chamber inlet face 109 surrounding inlet opening 113, it is advantageous according to the invention, to arrange it so that it forms a small angle with the external surfaces of wall 109 so that, in the vicinity of inlet 113, the thinners of the metal wall, if the wall is suitably cooled, helps to reduce energy losses.

Furthermore, the gases or vapors, other than those of plasma jet 107, which are present in chamber 101 during the treatment may also serve to convey electric current inside the chamber.

These gases or vapors result, in particular, from the atmosphere in which the treatment is performed, from vapors given off by the material treated and, possibly, from the gases produced by chemical reactions inside said materials.

Concerning the atmosphere in which the treatment is performed, it is known that monoatomic gases are more easily ionizable than diatomic gases. For instance argon is more easily ionizable, and can consequently more easily permit the passage of current, than nitrogen.

In particular, when the materials to be treated are brought to a temperature of the order of 3000°–3500° C., which may be obtained either with a plasma blowpipe or with a sun or image furnace, in an argon atmosphere, it is found that this atmosphere is slightly ionized when in contact with the molten materials, which enables it, in these conditions, to participate in the transmission of electric current.

The vapor tension of said materials may become preponderating for the passage of the electric current of circuit 106 from portion 103 to portion 104 inside chamber 101.

In the case, for instance, where the material that is treated comprises components such as alkaline oxides, some rare earth oxides, alumina, or chromium oxide $Cr_2O_3$, these oxides already have, at a temperature of above 1000° to 1500° C., high vapor tensions, the vapors being good conductors of electricity. Said vapors may then in the absence of a plasma jet, constitute the main vehicle for the electric current in chamber 101, the atmosphere in which the treatment is performed being practically nonionized at such temperatures.

The distribution of current between the various paths which have been considered will depend, in every case, upon the conditions of treatment, and in particular upon the relative ease with which electric current will flow through the gases and the molten layer, respectively, present in chamber 101.

The same will be true of the difference of potential to be applied between the portions 103 and 104 of chamber 101, this difference of potential further depending, when the heating means 102 consist of a plasma blowpipe, upon the characteristics thereof, in particular upon the nature of the gas from which the plasma jet has been formed and upon the flow rate thereof.

When this flow rate is increased, the starting of the inner arc is facilitated. It should be noted that the potential to be applied across portions 103 and 104 varies inversely with the variations in this flow rate.

Values of these potential differences to be applied across portions 103 and 104 will be given hereinafter. Of course, these potential differences also depend upon the dimensions of chamber 101.

The temperature reached inside chamber 101 is limited on the one hand, by the melting heat of the materials treated and, on the other hand, particularly when the heating means 102 consist of plasma blowpipes, upon the volatilization effects, in particular in contact with the very hot plasma jet when the energy supplied by the latter is sufficient.

When working at ordinary pressures, common refractory materials may be treated at temperatures of the order of 2000° to 3000° C., where they can be maintained in the liquid state.

But if the whole furnace is disposed in a closed vessel where the operation may be effected under pressure, it is possible, when the heating means 102 consist of a plasma blowpipe, to increase the temperature inside the molten mass as a result of the increase, as a function of the pressure, of the temperatures of vaporization of the materials being treated. Under a pressure of about one hundred atmospheres, some of the materials in question may be kept in the liquid state at temperatures ranging from 4000° to 5000° C.

In the embodiments considered up to now and described with reference to FIG. 1, there is only one inlet aperture 113 in chamber 101.

Of course, I may provide furnaces comprising a centrifugal chamber with two axial inlets 113 and $113_a$ in its opposed faces 109 and $109_a$, for instance as shown by FIGS. 3 and 4. This chamber consists, as in the preceding case, of two portions 103 and 104 separated and insulated from each other by an annular portion 105 made of an insulating material this chamber 101 comprising an electric heating circuit 106 closed through the gases introduced into chamber 101, for instance by means of two plasma blowpipes 102 and $102_a$ disposed close to the inlets 113 and $113_a$ respectively, of chamber 101 (FIG. 3) and/or through the intermediate of the layer 108 of molten product.

In this case, the inner walls 114 and $114_a$ must, preferably, both make a small angle with inlet faces 109 and $109_a$, respectively, for reasons above stated.

Of course, the heating means 102 associated with these furnaces may be made in any suitable manner. For instance, I may replace the plasma blowpipe $102_a$ of the embodiment of FIG. 3 by a sun furnace or image furnace $102_b$ (FIG. 4), the action of said heating means being possibly reduced or even completely terminated once the inner arc has been started in the furnace.

In the embodiments which have been described and more especially in those were the centrifugal chamber 101 containing the materials to be treated in associated with at least one plasma blowpipe, the electric circuit of the blowpipe and the inner electric heating circuit 106 disposed in the chamber are fed from different generators, respectively, and always remain independent from each other.

It is also possible, according to another feature of the invention, to provide a connection between either the anode 115 or the cathode 116 of an internal arc plasma blowpipe and at least one of the portions of the chamber so that, after melting has started inside the chamber by the action of the internal arc plasma blowpipe 102, there is obtained an arc between the chamber and said blowpipe.

Such connections may be established in many different ways. FIGS. 5 to 9 show some examples thereof in an illustrative but not limitative fashion.

FIG. 5 shows one of the simplest devices for displacing the arc between an internal arc plasma blowpipe and the inlet face 109 of chamber 101.

The plasma blowpipe 102 is fed from a direct current generator 117. I provide between said generator and the anode 115 of the blowpipe a variable resistor 118.

Furthermore, the positive terminal of generator 117 is also connected to the metal inlet face 109 of chamber 101.

After powder has been packed in chamber 101, prior to the start of treatment, plasma blowpipe 102 is placed at a distance from the inlet 113 of the chamber and brought into operation, resistor 118 having a minimum value.

Since, under the combined actions of plasma jet 107 and of the centrifugal force, there is formed inside the material under treatment a cavity of revolution lined with the molten material, plasma blowpipe 102 is moved nearer and nearer the inlet 113 until the following circuit is formed: cathode 116, generator 117, inlet face 109, plasma jet 107 and/or molten layer 108 and cathode 116. The closing of the circuit may be obtained for instance by increasing the resistance of resistor 118, such an increase having for its effect to make the potential of the anode of the blowpipe lower than the potential of the face 109 of chamber 101. This produces a transfer of the positive terminal of the arc from the anode 115 of the blowpipe to the face 109 of the chamber. Consequently, when the resistance of resistor 118 reaches a sufficient value, the arc of the plasma blowpipe is shifted towards the inside of chamber 101 and the available energy is more efficiently used. The resistance of resistor 118 may be further increased and in some cases the connection between generator 117 and anode 115 may be cut off.

I may even consider a supplementary transfer of the arc to the end wall 103 of the chamber, provided that the latter is made, as above described, of two portions 103 and 104 separated from each other by an annular portion 105 made of an insulating material. I then provide connections between generator 117 and the portions 103 and 104 of the chamber respectively (FIG. 6) and I insert in series between generator 117 and portion 104 a resistor 119 whose resistance is variable.

When the treatment is started, both of the resistors 118 and 119 are at their minimum resistance values and the plasma blowpipe is located at some distance from the opening 113 of the chamber. Under the same conditions as in the preceding case and by increasing the resistance of resistor 118, the following circuit is closed: cathode 116, generator 117, resistor 119, part 104, plasma jet 107 and/or molten layer 108, cathode 116. When the recess formed in the material that is treated reaches the end wall 103 of the chamber, the circuit comprising the following elements is closed: cathode 116, generator 117, end wall 103, plasma jet 107 and/or molten layer 108 and cathode 116, this circuit closing being made possible by increasing the resistance of resistor 119. This increase of the value of resistance 119 has for its effect to make the potential of face 109 less positive than that of end wall 103, so that the positive terminal of the arc is transferred from the inlet wall 109 to the end wall 103 of chamber 101. The value of resistor 119 must however preferably remain lower than that of resistor 118 so as to create progressively increasing potential differences between cathode 116 and anode 115, portion 104, and the end wall 103 respectively, the connections between generator 117 and anode 115 and portion 104, respectively being possibly in some cases open-circuited one after the other, so as to insure that all of the current will finally pass directly from cathode 116 to the end wall 103 of the chamber.

Figure 7:
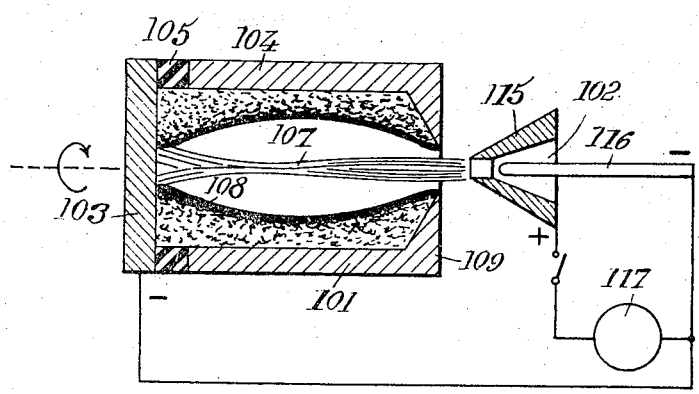

According to another embodiment illustrated by FIG. 7 the negative terminal of generator 117 may be directly connected to the end wall 103 of chamber 101. The plasma blowpipe 102 works in a conventional manner during the whole time the cavity of revolution is being formed inside the material being treated. When the molten, electrically conductive portion of the material being treated comes into contact with the end wall 103, the latter may then act as a cathode and I obtain the formation of a supplementary arc between the anode 115 of blowpipe 102 and end wall 103, which arc may be substituted for the internal arc of the blowpipe if cathode 116 is disconnected from generator 117.

Figure 8:
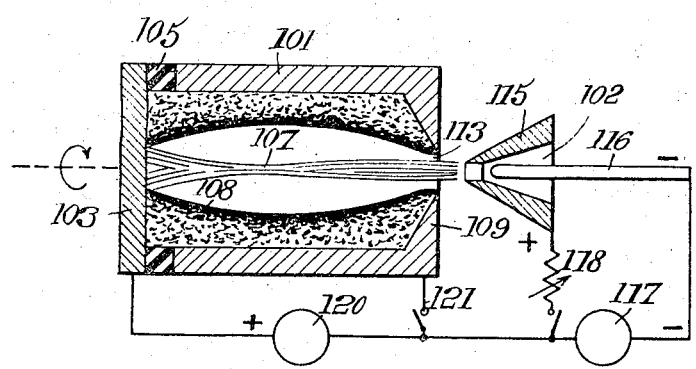

In the embodiment illustrated by FIG. 8, I associate with the generator 117, which feeds current to plasma blowpipe 102 a generator 120 mounted in series with the first one.

Generator 117 is connected, on the one hand, to the chamber inlet face 109 and, on the other hand, through generator 120 (which may be a direct current or alternating current generator) to the end wall 103 of chamber 101. Once the positive terminal of the arc has been transferred, first to the inlet wall 109 and then to the end wall 103 of chamber 101, it is possible, with a direct current generator 120, either to create the following electric circuit—cathode 116, generator 117, generator 120, end wall 103, plasma jet and/or molten layer 108, and cathode 116—or merely to close the internal circuit of chamber 101, plasma blowpipe 102 being adjusted to have a reduced action or even being placed completely out of action.

Figure 9:
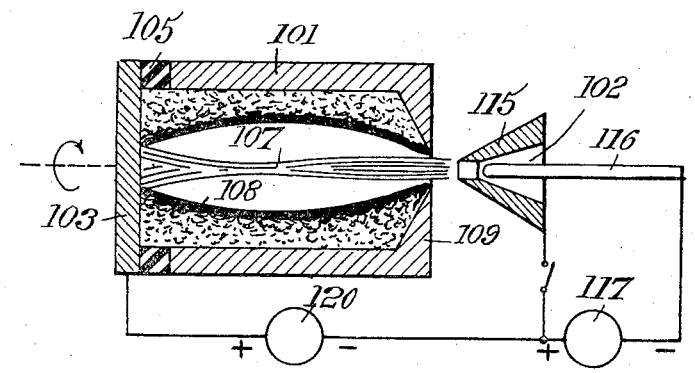

It is possible in this case, and when generator 120 supplies direct current, to cancel the common connection 121 leading from generators 117 and 120 to the front wall 109 of chamber 101, and also to short-circuit resistor 118. Such an arrangement is shown in FIG. 9. In this way, I easily obtain the transfer of the arc to the end wall 103 of chamber 101 when the molten material comes into contact therewith, the end wall potential then being, with respect to the potential of cathode 116, substanially more positive than that of anode 115.

To bring into evidence the gain of energy obtained in chamber 101 and the better utilization of the energy supplied by the blowpipe, I performed the following experiment with a small centrifugal chamber 101 cooperating with a plasma blowpipe 102, said chamber and said blowpipe being mounted as illustrated in FIG. 8.

Chamber 101, in which were placed 500 grams of alumina, had a diameter of 60 mm. and a length of 100 mm.

The plasma blowpipe was fed by a generator 117 capable of supplying a current of 420 amperes at a potential difference of 22 volts, the power being thus 9.24 kw. It was found that 4.43 kw. of this energy was lost in the cooling water of the blowpipe when the latter alone supplied heat.

I formed a cavity of revolution in the alumina contained in the centrifugal chamber by means of the plasma blowpipe. Within three minutes the wall of the cavity had moved a sufficient distance in chamber 101 to permit the striking of an arc between the end wall 103 of the chamber and the cathode 116 of the blowpipe.

The difference of potential supplied by means of generators 117 and 120 between the end wall 103 of chamber 101 and the cathode 116 of the blowpipe was 55 volts before the striking of the above mentioned arc. When this arc was started, this potential difference dropped to 50 volts and a current of an intensity equal to 25 amperes was measured on end wall 103.

By increasing the argon output of the blowpipe to 50 liters per minute, this potential difference was reduced to 30 volts and the intensity of current measured on end wall 103 rose to 120 amperes.

A reduction to 330 amperes of the current at the anode of the plasma blowpipe was observed. The current at the cathode of the plasma blowpipe was therefore 330 plus 120, that is to say 450 amperes. At the same time, it was noted that the energy lost in the cooling water of the plasma blowpipe was only 2.8 kw. I thus obtained on the inside of the chamber a considerable amount of energy with a much more efficient utilization of the energy supplied by the blowpipe.

In all of the above described embodiments, where chamber 101 is made of two portions 103 and 104 separated from each other by an insulating piece 105, I advantageously provide, opposite the portions of said insulating part 105 which are in contact with the material to be treated, metallic surfaces, preferably integral with the walls of chamber 101, forming protective screens, or heat shields for protecting the insulating material against the direct action of the heat developed inside the chamber.

Thus in the embodiment of FIG. 1, the end wall 103 of chamber 101 includes a projecting central portion, the later surface 122 of this projection protecting the portions 123 of annular element 105, which are in contact with the material to be treated, against the direct action of the plasma jet.

Figure 2:
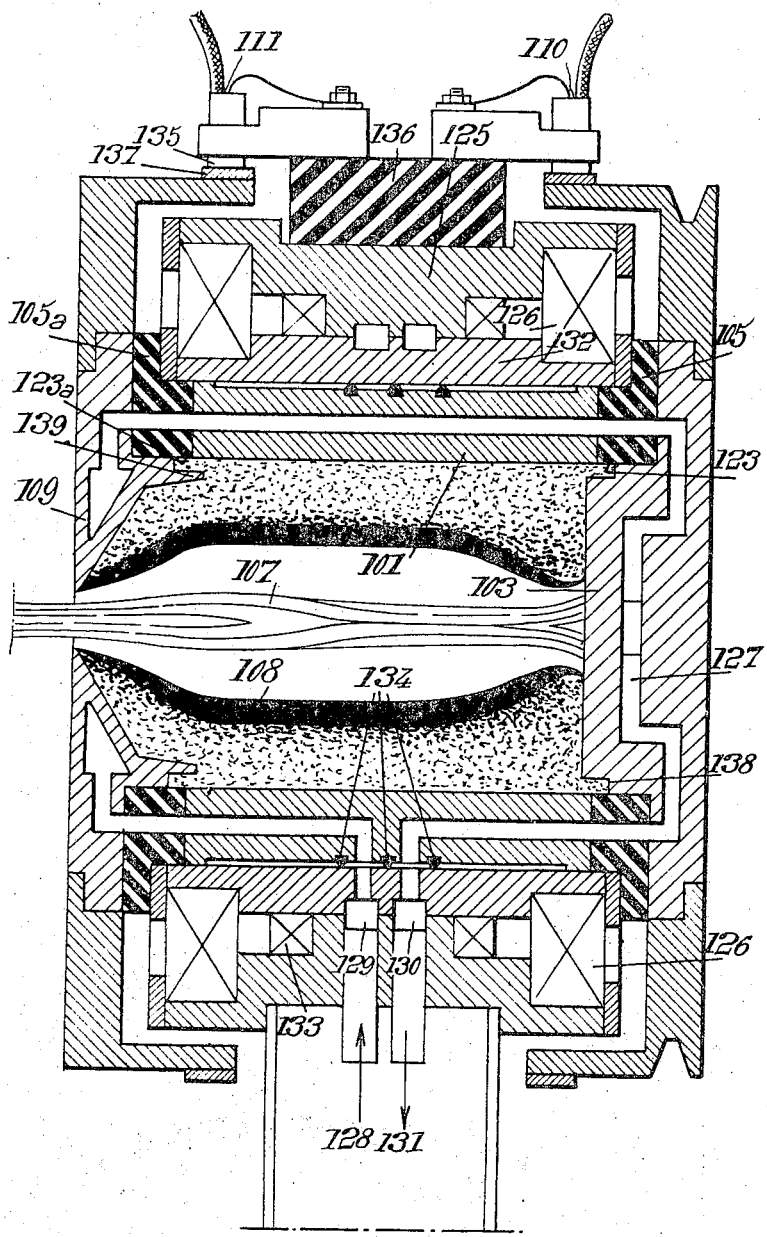
FIG. 2 shows a longitudinal cross-sectional view of a modified form of the embodiment of FIG. 1.

Advantageously, I complete the device of the present invention by the arrangements shown in FIGS. 1 and 2.

In FIG. 1, centrifugal chamber 101 is mounted on the end of a rotating shaft 124 which is rotatable in fixed frame 125 through the intermediary of a bearing 126.

The internal dimensions of chamber 101 are as follows: length 70 mm. and diameter 80 mm.

The circuit 127 for cooling chamber 101 is fed by means of passages in shaft 124 through external conduits extending through fixed frame 125.

Water enters the fixed frame 125 at 128, passes into shaft 124 through annular chamber 129, which is constantly in communication with a radical channel $127_a$ provided in shaft 124, then flows through cooling circuit $127_b$, $127_c$, $127_d$, $127_e$, $127_f$ and $127_g$, to be evacuated through channel $127_h$ provided in shaft 124 and through another annular chamber 130 formed in frame 125 and communicating with an outlet pipe 131.

In FIG. 2 (where the elements identical with those of FIG. 1 are designated by the same reference numerals), I have shown an embodiment of my invention especiallly intended for the treatment of larger quantities of materials. The inner dimensions of the furnace are as follows: length 150 mm. and diameter 100 mm. Chamber 101 is disposed within a rotary cylinder 132 adapted to drive said chamber 101 through bearings 126. The drive of cylinder 132 and chamber 101 may be performed by means of a belt (not shown) which drives a pulley disposed in axial alignment with, and mounted on one of the end faces of the furnace.

Chamber 101 is in this case made of three portions separated from one another by annular elements 105 and $105_a$ made of insulating material, the end wall 103 and the front wall 109 of chamber 101 being connected to the terminals of an electric power generator.

In the cooling circuit, which is very similar to that illustrated in FIG. 1, I provide annular chambers 129 and 130 which ensure the connection between fixed frame 125 and rotary cylinder 132, joints 133 of the type commonly used to ensure fluidtightness between a fixed part and a rotary part, and toroidal packing joints 134 between rotary cylinder 132 and chamber 101.

In a general manner, the parts which serve to conduct a maximum of heat to the cooling water are made of copper, with the exception of the inner walls of chamber 101 which are made of steel for reasons of mechanical strength, such strength being required in particular when the powdery products to be treated are preliminarily compressed in the chamber.

The electric connections at 110 and 111 permit end portion 103 and front wall 109 to be placed at different respective potentials. These connections comprise contacts consisting of brushes 135 carried by fixed frame 125 through an insulating support 136 and rubbing against axial annular members 137 rigid with the centrifugal chamber 101.

Tests have been made with chambers 101 according to FIGS. 1 and 2.

In the chamber of FIG. 1, I used, between portions 103 and 104 of chamber 101, potential differences as high as 200 volts with circuit 106 open. With internal heating circuit 106 closed, I produced an arc under a potential difference of 30 volts with a current of 50 amperes.

In the embodiment of FIG. 2, which was of greater size, the voltages applied between portions 103 and 104, under open circuit conditions, ranged from 200 to 1000 volts and I produced, by closing circuit 106, an arc at a potential difference of 40 volts and with a current of 300 amperes. Therefore the respective powers in the devices of FIGS. 1 and 2 were 1.5 kw. and 12 kw. inside chamber 101.

It goes without saying that use can be made of only one of the two connections so as thus to produce electric arrangements as illustrated in FIGS. 5, 7 and 9.

In the construction of FIG. 2 as in that of FIG. 1, the annular element 105 of insulating material is protected by providing an annular groove 138 in the end wall of chamber 101, the external side of this groove being constituted by the surface 123 of insulating annular element 105.

In a similar manner, the front portion 109 of the chamber is provided with a frusto-conical axial projection 139 extending inwardly, opposite the surface $123_a$ of annular element $105_a$, so as to protect element $105_a$ against the action of the plasma blowpipe. This projection 139 may be provided with a cooling recess (not shown by the drawing).

Thus I obtain a very efficient protection of annular elements 105 and $105_a$. Under normal conditions of operation, the temperature should not rise above approximately 100° C.

Concerning the blowpipe used in combination with either of the two above described chambers, I advantageously make use of an apparatus including a frusto-conical, sharp end which constitutes the anode 115 thereof, which blowpipe can be placed in proximity to the inlet of chamber 101.

Owing to its shape, this blow pipe may be used in combination with other external heating means, such as a sun furnace or an image furnace, the convergent radiation issuing from their respective mirrors being substantially unimpeded by the presence of the pointed end of the blowpipe.

The axis of the blowpipe may be in coincidence with that of chamber 101. But these two axes may also make a substantial angle with each other.

Advantageously, cathode 115 is made of copper and cathode 116 is made of a bar of tungsten fixed at the end of a hollow cathode support 140, made of copper, which permits an axial supply of the plasma-forming fluid.

Centering of the cathode is ensured by two bearings 141 and 142. The front bearing 142, made of an electrically insulating material, is held by the rear end of the frusto-conical anode 115 and the rear bearing 141, also made of an electrically insulating material, is engaged by means of a force fit in the cylindrical body 102 of the blowpipe.

This last mentioned bearing 141 is provided with a chamber 145 for the feed of the plasma-forming fluid to the hollow cathode carrier 140. Furthermore, the last mentioned bearing 141 carries an inlet conduit 146 for the cooling water and an outlet conduit 147 for the outflow of said water. This bearing 141 also comprises means 148 for adjusting the position of cathode carrier 140.

The cooling water, which enters through 146, reaches the base of frusto-conical part 115. Then it is compelled to move along an inner partition 149 towards the apex of said portion 115. It then flows back, passes through front bearing 142 and along cathode carrier 140 to finally flow out at 147.

The blowpipe is fed with direct current at a working voltage ranging from about 30 volts (argon plasma) to about 100 volts (hydrogen plasma).

Of course chamber 101 might be stationary.

It might be fed with threephase current.

If it is desired to treat materials which are electricity conductive in the solid state, chamber 101 might be divided into at least two portions separated from each other by an insulating piece and having an insulating jacket. In such a chamber, the end wall 103 would have an isolated electrically conductive portion, for instance on its axis, so as to permit the formation of an arc inside said chamber.

I might also make use of a centrifugal chamber to treat materials which are conductors of electricity, while ensuring a satisfactory thermal insulation for the walls of said chamber by preliminary packing a refractory material in the chamber in such a way as to cause it to form a recess extending as far as the end of said chamber, said conducting material being treated and retained in said recess under the effect of the centrifugal force in contact with an electric arc established inside the chamber.

Turning now to FIGS. 10 and 11, there are shown two embodiments of the invention in which means are provided for permitting a controlled atmosphere to be created within the treating chamber.

The device of FIG. 10 comprises a treating chamber 101 adapted to hold the material to be treated and constituted by two portions 103 and 104, rigidly joined together, and electrically isolated from one another, by an electrically insulating section 105, said chamber being rotatively mounted on a base 125 through the intermediary of bearings 125, which may be of the roller-bearing type for example. The device further includes means (not shown) for rotating chamber 101 at a relatively high speed.

An external heating means is placed opposite one end of chamber 101 for applying heat to the material in said chamber. This heating means may consist, for example, of a plasma blowpipe 102 comprising at least one hot cathode 116 and at least one cooled anode 115. The chamber also includes cooling fluid conduit means comprising channels 127, an annular orifice 129 in permanent communication with a fluid, inlet 128, and an annular orifice 130 in permanent communication with a fluid outlet 131.

Electrical power connections are provided both between the electrodes of blowpipe 102 and between one of these electrodes and at least one of the portions 103 and 104 of the chamber, so that, after the material to be treated has begun to melt under the action of the heat delivered by blowpipe 102, an arc may be established between said blowpipe and said one of the portions 103 and 104 of chamber 101.

The electrical connections may, to cite one non-limitative example, be constituted by: a direct connection between the negative output terminal of generator 117 and blowpipe cathode 116; a connection, through the intermediary of a variable resistor 118, between the positive output terminal of generator 117 and blowpipe anode 115; a connection, through the intermediary of a variable resistance 119, between the positive generator output terminal and portion 104 of chamber 101; and a direct connection between said positive terminal and chamber portion 103.

This arrangement functions in the following manner:

At the beginning of a treating operation, the two resistances 118 and 119 are both at their minimum resistance values and arc exists between electrodes 115 and 116. Then the value of resistance 118 is increased until the positive potential on portion 104 is a certain amount greater that on anode 115. This voltage relation causes the positive end of the arc to jump from anode 115 to part 104, causing the principal current flow to exist along the path including generator 117, cathode 116, jet 107 and/or melted layer 108, part 104, and resistor 119.

Then, when the cavity in the material being treated reaches the end wall formed by portion 103, the resistance value of resistor 119 may be increased, while always remaining smaller than the resistance of resistor 118, until the potential on portion 104 drops to a certain level below that on portion 103 and the positive end of the arc is caused to jump to portion 103. The principal current path is then constituted by generator 117, cathode 116, jet 107 and/or melted layer 108 and portion 103.

It should be observed that when the resistance of resistor 119 is lower than that of resistor 118, progressively increasing potential differences exist between cathode 116 and anode 115, portion 104, and portion 103. The dependability of the above-described arc transferring operations could be improved by disconnecting resistor 118 after the positive end of the arc has been transferred to portion 104, and by disconnecting resistor 119 when this end of the arc has been shifted to portion 103. Such a procedure assures that, ultimately, all of the current will flow through portion 103 and there will be no danger of a re-shifting of that end of the arc back to portion 104 or anode 115.

It should be recalled at this point that the atmosphere existing in the chambers of the earlier-described embodiments of this invention consisted principally of the fluid consituting the plasma jet, which fluid was necessarily selected so as to fulfill the condition for correct operation of the blowpipe. This fluid is generally selected from among the rare gases such as argon or helium, or from gases which are chemically inert with respect to the blowpipe electrodes, such as nitrogen, for example. The device of FIG. 10 is designed to permit the blowpipe to function properly while permitting the chamber 101 to contain an atmosphere of which the composition is determined solely in accordance with the type of treatment to be carried out. This atmosphere could be caused, for example, to be oxidizing or reducing, or could be chlorinated.

To this end, the device of FIG. 10 is arranged to receive a gaseous fluid 200 of well-determined composition and to pass this fluid through chamber inlet 113, said fluid being heated to a high temperature by the arc, as it enters chamber 101.

Since this fluid constitutes a large portion of the atmosphere in chamber 101, the proper choice of its composition permits the material in the chamber to be treated in a predetermined atmosphere whose composition differs from that of the gas constituting the blowpipe jet.

To achieve this result, a rigid enclosure 201 is mounted on blowpipe 102 and is connected in a fluid-tight manner to base 125 by means of a joint 202. The gaseous fluid 200 is introduced into this enclosure through an inlet orifice 203 preferably arranged on the periphery of said enclosure in such a way as to aid the creation of a whirlpool circulation in the enclosure, which circulation improves the homogenization of the atmosphere in the chamber. It is preferred that enclosure 201 be made of an electrically non-conductive material.

It should be noted that the addition of enclosure 201 and joint 202 creates a gas-tight connection between the interior of blowpipe 102 and the interior of chamber 101. It is therefore necessary to provide, at the end of chamber 101 removed from inlet 113, an exhaust passage 204, which is preferably arranged to be water-cooled for the evacuation of gas after it has traversed the chamber.

The walls of passage 204 may form an integral part of portion 103, which portion also comprises: the projection 122 forming a heat shield for section 105; channels 127 for circulating cooling water around both passage 204 and chamber 101; inlet and outlet orifices 129 and 130; and a driving member 205 which may, for example, be in the form of a pulley having a trapezoidal groove. Portion 103 is supported by a stationary sleeve 206 carrying inlet and outlet conduits 128 and 131, respectively, which communicate continuously with annular orifices 129 and 130, respectively. Portion 103 is permitted to rotate in sleeve 206 by interposed needle bearings 207.

FIG. 11 shows another embodiment of this invention in which a relatively sturdy and dependable structure is provided for permitting the material to be treated in a completely closed environment. In FIG. 11, elements which are identical with corresponding elements of FIG. 10 have the same reference characters.

According to this embodiment, blowpipe 102 is connected in a fluid-tight fashion to one end of chamber 101 and electrical power means are provided for transferring at least one end of the arc from one of the blowpipe electrodes to at least one of the portions 103 and 104 of the chamber 101.

There is also provided an exhaust passage 204 for the gasses ejected by the blowpipe, said passage being furnished with an extension 204a equipped with a closing member such as butterfly valve 208, for example.

With this arrangement it would be possible to either reduce or completely shut off the output from blowpipe 102 and to close valve 208 in order to cause the arc extending through the enclosure to exist in a completely closed environment which assures a substantial improvement in the efficiency with which the heat produced by this arc is utilized.

The blowpipe may be mounted on chamber 101 by forming this chamber with a portion 209 serving the purpose of a flange and to which is bolted a counter-flange 210, a packing joint 211 being provided between the latter two elements, and by mounting on counter-flange 210 a piece 212 supporting the blowpipe anode 115 and a piece 213, made of an electrically nonconducting material, supporting a sheath 214 which holds the blowpipe cathode support 140. Sheath 214 may be made of several sections 214a, 214b and 214c welded or brazed together and is formed with passages 146 and 147 which ensure the circulation of cooling water around anode 115 and cathode support 140.

A stationary sleeve 215 is provided around the section 214c of sheath 214 to provide means which, during the rotation of chamber 101 and blowpipe 102, ensures the circulation of cooling water in passages 146 and 147, permits the delivery of plasma-forming gas, through tube 145, to the passage in cathode support 140, and provides support and guidance for sheath 214 through the intermediary of needle roller bearings 216.

There is also rigidly connected to counter-flange 210 a driving element 205 having a pulley groove of trapezoidal cross-section. The chamber 101 and blowpipe 102 are intended to be driven by any suitable motor (not shown) through the intermediary of an endless driving belt (also not shown) connected between said motor and said groove. Element 205 is also furnished with a slip ring 217, which may be made of copper, for example, with which a brush 218 cooperates to provide an electric current path between generator 117 and blowpipe anode 115. This path may be completed either by the provision of a conductor between ring 217 and anode 115 or, preferably, by making elements 205, 210 and 212 of highly conductive material.

The end of cathode support 140, which extends beyond sheath 214 and sleeve 215, is furnished with a crown 219 carrying a slip ring 220 upon which rubs a brush 221 connected to generator 117. Since support 140, crown 219 and ring 220 are all made of conducting material, a current path is thus established between the generator and blowpipe cathode 116.

It may be noted that in the embodiment of FIG. 11 the chamber portion 104 is directly connected to blowpipe anode 115 through the intermediary of low resistance members 210 and 212 and that, as a result, the connection comprising resistor 119 of FIG. 10 may be eliminated.

At the other end of chamber 101 from blowpipe 102, chamber section 103 is made integral with a crown 222 carrying a ring 223 upon which rubs a brush 224 connected to generator 117, crown 222 and ring 223 of course being made of conducting material.

The electrical power connections to this device are thus constituted by: a direct connection between the negative terminal of generator 117 and blowpipe cathode 116; a connection, through the intermediary of variable resistor 118, between the positive generator terminal and both blowpipe anode 115 and chamber section 104; and a direct connection between the positive generator terminal and chamber section 104.

The gas exhaust system is constituted by a metallic tube 204 rigidly connected to the chamber portion 103 and surrounded by a sheath 225 within which are formed the inlet orifice 129 and the outlet orifice 130 for cooling water, and canals 227 for assuring the circulation of this water around tube 204 and for communicating with the chamber passages 127.

A stationary sleeve 206 surrounds and supports sheath 225 through the intermediary of needle bearings 207, and thus serves to maintain sheath 225 and tube 204 in alignment. Sleeve 206 contains passages which assure a permanent communication between the cooling fluid inlet 128 and orifice 129 and between fluid outlet 131 and orifice 130.

To the end of sleeve 206 is attached the exhaust system extension 204a which carries a valve 208. Extension 204a and valve 208 do not, therefore, form a part of the rotating assembly.

With the structure of FIG. 11, it is possible, once the arc is established between cathode 116 and chamber section 103, to act on valve 208, and on an inlet valve 226 through which the plasma-forming fluid enters the blowpipe, in such a way as to diminish or turn off completely the flow of gas through chamber 101. Such a procedure causes the arc to exist, and to emit heat, in a closed environment which, because there is little or no gas flow to carry heat out of the chamber, has the effect of substantially increasing the efficiency of utilization of the heat generated by the arc.

Turning now to FIGS. 12–18, there are shown several embodiments of the present invention in which the jet of an auxiliary blowpipe serves as one of the arc electrodes and in which special means are provided for controlling the atmosphere existing in the treatment chamber.

Figure 12:
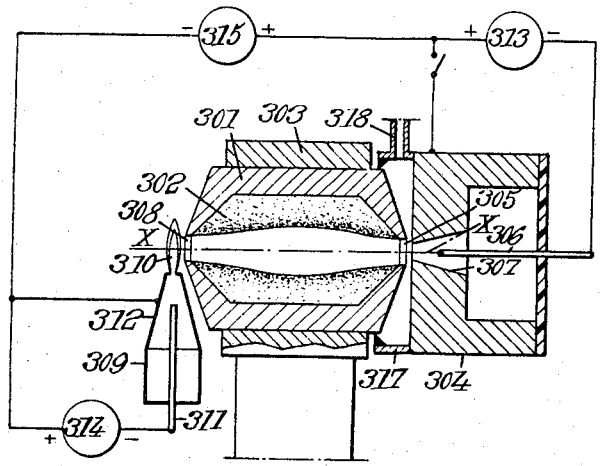

Referring first specifically to FIG. 12 which, like FIGS. 13–16, is of a simplified, schematic nature, there is shown a material treating apparatus comprising a rotatable treating chamber 301, which is preferably water cooled with the aid of canalizations similar to those provided in the precedingly-described embodiments and which contains the material to be treated 302. Chamber 301 is supported in a stationary frame 303 and suitable means (not shown) are provided for assuring the rotation of said chamber about a horizontal axis.

At one end of chamber 301 there is disposed a plasma blowpipe 304, which constitutes the principal blowpipe of the apparatus, placed near the chamber entrance 305 and comprising at least one hot cathode 306 and at least one annular anode 307 which is preferably cooled by circulating water.

The present embodiment is principally characterized in that the chamber 301 is provided with a second opening 308 placed approximately opposite opening 305 and in that at least one auxiliary blowpipe 309 is disposed adjacent this orifice. In addition, electrical connections are provided between at least one of the electrode of blowpipe 304 and the gaseous jet 310 emerging from blowpipe 309.

The rate of pollution of the atmosphere within the chamber 301 is thus reduced since the gaseous jet 310 constitutes one of the electrodes for the arc after one end of the latter has been transferred thereto, thus eliminating the presence, within the chamber, of a solid electrode whose erosion could create pollution.

To this end, the chamber 301 is given the form of a solid of revolution with both openings 305 and 308 being centered on the axis XX of revolution of said solid.

The auxiliary blowpipe 309 is then preferably disposed so that its gaseous jet 310 is directed perpendicular to axis XX and this blowpipe is constituted by at least one hot cathode 311 and at least one annular anode 312 which is preferably cooled by circulating water.

The electrical connections for the apparatus may be made to comprise a direct conductive connection between cathode 306 and the negative output terminal of a D.C. voltage generator 313, a direct conductive connection between the positive output terminal of generator 313 and both anode 307 and the positive output terminal of a second D.C. voltage generator 315, a direct conductive connection between the negative output terminal of generator 315 and both auxiliary blowpipe anode 312 and the positive output terminal of a third D.C. voltage generator 314, and a direct conductive connection between the negative output terminal of generator 314 and auxiliary blowpipe cathode 311. With such an arrangement, generator 313 serves as the electric power supply for blowpipe 304 and generator 314 serves as the power supply for blowpipe 309. All of the generators have adjustable output voltages in order to permit the establishment and transfer of the arc.

Finally, the region separating blowpipe 304 from chamber 301 is enclosed by a hermetic connection 317 having a gas inlet 318 through which gas is introduced into chamber 301 to permit a controlled atmosphere to be established within said chamber.

Once an arc has been established between the anode 307 of blowpipe 304 and the jet 310 of blowpipe 309, as a result of appropriate manipulations of the values of the output voltages of the generators, it is possible to end the operation of blowpipe 304, the heating of the material 302 being then ensured by the arc maintained by the output voltage from generator 315.

Figure 13:
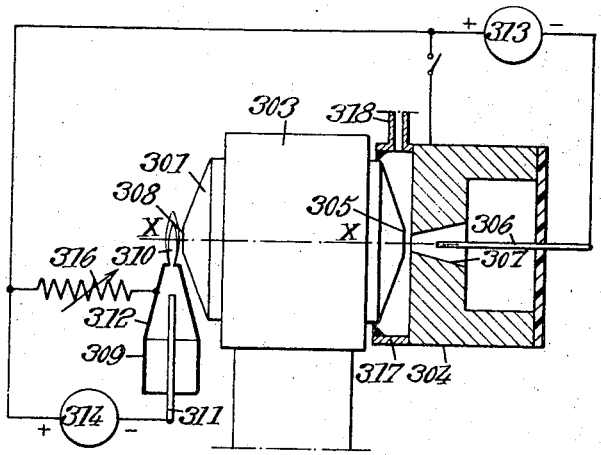

FIG. 13 shows a variation of the embodiment of FIG. 12 in which generator 315 is replaced by a short circuit and in which the potential difference required to establish and maintain the arc between anode 307 and jet 310 is produced by the adjustment of a variable resistor 316 connected between the positive terminal of generator 314 and the anode 312 of blowpipe 309.

By adjusting the value of resistor 316, most of the current flowing through the apparatus can be made to flow along the path comprising anode 307, the interior of chamber 301 and gas jet 310.

In order to diminish even further the slightly adverse effects which might result if the atmosphere within the chamber should become contaminated by the eventual erosion of anode 307, it might be advantageous to fabricate this anode from a metal such as tungsten or platinum and/or to create a rotating magnetic field around blowpipe 304 in order to produce a continuous rotation of the point at which the arc is attached to anode 307.

Figure 14:
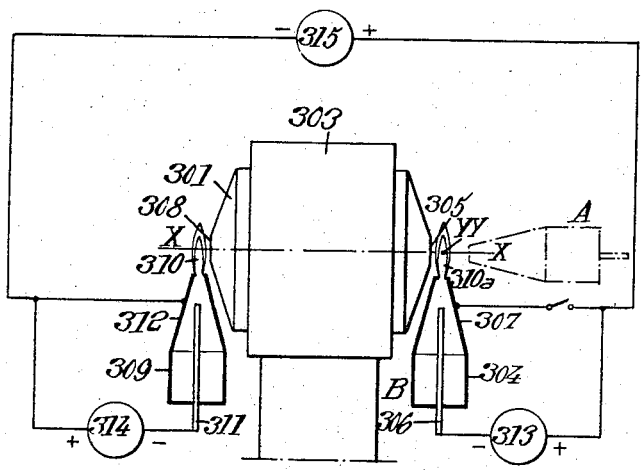

FIG. 14 shows yet another variation of the embodiment of FIG. 12 in which the hermetic connection between chamber 301 and blowpipe 304 is removed and the blowpipe 304 is mounted so as to be movable from a first position (that of FIGS. 12 and 13), in which it carries out the initial heating of the material in chamber 301, to a second position, in which it performs a function identical with that of blowpipe 309.

For this purpose, blowpipe 304 may, for example, be mounted on a chassis (not shown) capable of pivoting about an axis YY through an angle of around 90°. The initial position A occupied by the blowpipe, when it heats the material, is shown in dot-dash lines and the final position B occupied by the blowpipe when its jet is to serve as an electrode for the arc passing through chamber 301, is shown in solid lines.

It should be noted that the electrical connections of the embodiment of FIG. 14 are identical with those of FIG. 12, particularly in that the generator 315 can remain connected between the anodes of the two blowpipes.

The operation of the device of FIG. 14 begins with blowpipe 307, in position A, applying heat to the material in chamber 301 until this material begins to melt. Then blowpipe 304 is swung into position B and the heating of the material is continued by the arc established by generator 315 between jet 310 and the jet 310a of blowpipe 304.

The arrangement of FIG. 14 functions very effectively when it is acceptable to treat material in the presence of an atmosphere composed substantially of the gas ejected by blowpipe 304, said gas being, in general, constituted by rare gasses, such as argon or helium, or by gasses which are chemically inert with respect to the materials forming the electrodes of blowpipe 304, one example of such gasses being nitrogen.

However, if it is desired to carry out the treatment in a chemically controlled atmosphere (e.g. chlorinated, oxidizing, or reducing), then it is necessary to provide a suitable hermetic connection, such as element 317 of FIG. 12 and 13, which permits the appropriate gas to be introduced into chamber 301 through inlet passage 318.

FIGS. 15–17 show various modifications of still another embodiment of the present invention permitting an even more accurate control of the composition of the atmosphere existing within chamber 301. This embodiment is of particular interest when it is desired to have a very pure atmosphere in the treating zone.

The embodiment of FIG. 15 is constituted by a device which is identical to that of FIG. 12 with two important exceptions: the annular space between cathode 306 and anode 307 of blowpipe 304 is connected, by means of a conduit 320 carrying a valve 320a, to a source of low pressure 321, and generator 315 is connected between the blowpipe cathodes rather than the anodes, as in FIG. 12.

The connection of generator 315 is such that the arc finally established through chamber 301, will pass from jet 310 to cathode 306.

The low pressure source 321, which may be constituted, for example, by a vacuum pump, is provided so that after the arc has been established between jet 310 and cathode 306, a portion of the specially selected treatment fluid 319 which was introduced into the space enclosed by connection 317 is drawn through the annular space separating cathode 306 from anode 307 in such a way as to prevent impurities coming from blowpipe 304 from passing into chamber 301.

Valve 320a is preferably of the adjustable type so as to permit the rate at which fluid is drawn past the blowpipe to be readily varied.

The electrical power system for establishing and transfering the arc may be as shown in FIG. 15, wherein generator 315 has its negative terminal connected to the cathode 311 of blowpipe 309, or as shown in the variation of FIG. 16, which is identical in every other detail to the arrangement of FIG. 15, wherein this generator terminal is connected to the anode 312 of said blowpipe. In either case, the cathode 306 of blowpipe 304 will act as the anode of the arc established between it and jet 310.

It should also be noted that the gas flowing past blowpipe 304 flows annularly around cathode 306.

Turning now to FIG. 17, there is shown a cross-sectional view of a working device embodying the concepts set forth above in connection with FIGS. 15 and 16. This device has proved to be highly useful for the treatment of a refractory material such as pure zirconium, which material has been treated in such devices in quantities of around 2.2 kg. In FIG. 17, elements identical with corresponding elements of FIGS. 15 and 16 have been given the same reference numerals.

Thus, the device basically comprises a rotatable chamber 301 constituting a treating oven, said chamber being in the form of a solid of revolution having a longitudinal axis XX which also constitutes the chamber axis of rotation. Material to be treated 302, which is here assumed to be pure zirconium, is disposed within chamber 301 and the chamber is rotatably mounted in a stationary housing 303 through the intermediary of ball bearings 322. The chamber is driven by a motor and drive belt (not shown) through the intermediary of a pulley 323 rigidly connected to the chamber outer wall and having a trapezoidal groove on its outer circumference for receiving said drive belt.

The chamber is formed with a heat dissipating system constituted by conduits 324 distributed circumferentially around the material treatment region and by annular channels 325 and 326 in constant communication with the ends of conduits 324 during the rotation of the chamber. Channels 325 and 326 thus ensure a constant supply of cooling water to the conduits 324, which water is delivered by way of inlet pipe 327 and carried off by way of outlet pipe 328.

A principal plasma blowpipe 304 is disposed coaxially with respect to chamber 301 and is placed so that its gas outlet is adjacent chamber inlet 305. The blowpipe comprises a hot cathode 306 mounted on a support 329 which is preferably water cooled, and an annular anode 307 in the form of a converging nozzle mounted in a support 330. The cooling of anode 307 is assured by a flow of water circulating between inlet and outlet passages 331 and 332.

Chamber 301 presents a second opening 308 which is coaxial with the longitudinal chamber axis XX and which is disposed at the opposite end of the treatment region from opening 305. An auxiliary plasma blowpipe 309 is disposed adjacent opening 308 in such a way that the blowpipe jet is substantially perpendicular to axis XX. This jet will serve as one electrode for the arc when the latter has been caused to pass axially through the treatment chamber. Blowpipe 309 comprises a hot cathode 311 and an annular anode 312 which is preferably formed with internal passages for the circulation of cooling water.

The region between blowpipes 304 and chamber 301 is enclosed by a connecting member 317 rigidly connected to blowpipe 314 and joined to housing 303 by means of an annular, fluid-tight seal 333. Connecting member 317 is provided with an inlet conduit 318 through which a treatment fluid 319 of predetermined composition may be introduced into chamber 301. Such a fluid may, for example, be constituted by oxygen so that, after the arc has been established through the chamber, the treatment will be carried out in an oxidizing atmosphere, which is desirable for the treatment of pure zirconium.

Finally, means are provided for permitting a portion of the treating fluid to be drawn off through the principal blowpipe 304, it being desired that this drawing off be accomplished only after one end of the arc has been transferred to jet 310. These means comprise a conduit 320 which has its inlet in communication with the annular region separating cathode 306 from anode 307, a valve 320a for varying the rate at which fluid is drawn off, and a low pressure source 321, constituted by a rotary piston vacuum pump for example, connected to the other end of conduit 320.

The electrical power circuitry is identical with that of FIG. 16, the generator 315 acting to maintain the arc in its final position between jet 310 and cathode 306.

The above-described device functions in exactly the same general way as the previously-described embodiments, it being understood that the specific mode of operation thereof depends entirely on the material being treated and the type of treatment to be carried out.

FIG. 18 shows a slight modification of the FIG. 17 device wherein opening 308 and the outlet end of blowpipe 309 are enclosed by a cover 334 having double walls between which flows cooling water passing from inlet conduit 335 to outlet conduit 336. The cover carries a screw-on porthole 337 coaxial with chamber axis XX. The arrangement is completed by the provision of an annular gas outlet baffle 338 disposed between cover 334, which is stationary, and pulley 323, which is rotating. Such an arrangement permits the interior of chamber 301 to be effectively isolated from the outside, which is sometimes necessary when the treatment to be carried out is incompatible with air or when the area in which the apparatus is placed has undesirable components in its atmosphere.

While several preferred embodiments of the present invention have been shown and described in detail herein, it should be understood that many variations and modifications could be made to those embodiments without departing from the spirit of the invention, the coverage of which should therefore be limited only by the scope of the appended claims.

What I claim is:

1. A furnace for treating materials at high temperatures, comprising a rotatable heating chamber having a central material receiving region and an inlet opening disposed in one end of said chamber through which said central region communicates with the region outside said chamber, a principal plasma blowpipe disposed in proximity to said inlet opening, a second opening disposed in the end of said chamber which is opposite the end containing said inlet opening, an auxiliary blowpipe disposed in promixity to said second opening, and electrical power means connected to said apparatus to maintain a current arc between said principal blowpipe and the jet produced by said auxiliary blowpipe.

2. A furnace according to claim 1 wherein said inlet opening and said second opening are centered on the axis of rotation of said chamber, and said auxiliary blowpipe is positioned so that its jet will extend in a direction which is substantially perpendicular to said axis.

3. A furnace according to claim 1 wherein said principal blowpipe comprises an anode and a cathode and said auxiliary blowpipe comprises an anode and a cathode, and wherein said electrical power means comprises an electrical current generator connected between said principal blowpipe anode and said auxiliary blowpipe anode.

4. A furnace according to claim 1 wherein said principal blowpipe and said auxiliary blowpipe each have a cathode and an anode, and wherein said electrical power means comprises a variable resistor connected between said anode of said principal blowpipe and said anode of said auxiliary blowpipe.

5. A furnace according to claim 1 further comprising means disposed around said principal blowpipe for creating a rotating magnetic field which continually displaces the point at which an arc attaches to said principal blowpipe.

6. A furnace according to claim 1 further comprising carrier means upon which said principal blowpipe is mounted, said carried means being movable between a first position in which it applies heat to the material in said chamber and a second position in which it can act as an arc electrode.

7. A furnace according to claim 6 wherein said principal blowpipe and said auxiliary blowpipe each comprises an anode and a cathode and wherein said electrical power means comprises a current generator connected between the anodes of said two blowpipes.

8. A furnace according to claim 1 further comprising a connector connecting said principal blowpipe to said chamber in such a way as to hermetically enclose the region between said blowpipe jet and said chamber inlet opening, said connector comprising inlet means for introducing a selected gas into said chamber region.

9. A furnace according to claim 1 wherein said principal blowpipe and said auxiliary blowpipe each comprises a cathode and an anode and said electrical power means comprises an electrical current generator connected between the cathodes of said two blowpipes.

10. A furnace according to claim 1 wherein said principal blowpipe and said auxiliary blowpipe each comprises a cathode and an anode and said electrical power means comprises an electrical current generator connected between said principal blowpipe cathode and said auxiliary blowpipe anode.

11. A furnace according to claim 1 further comprising isolating means disposed around said second opening in said chamber for isolating said material receiving region from the region outside said isolating means, and baffle means disposed between said isolating means and said chamber for permitting gas which has passed through said chamber to be evacuated at a low flow rate.

12. A furnace for treating materials at high temperatures comprising a rotatable heating chamber having a central material receiving region and one opening at one end of said chamber through which openings said central region communicates with the region outside said chamber, a principal plasma blowpipe disposed in proximity to one of said openings and comprising a cathode and an anode separated from each other by an annular passage, and means for supplying plasma forming gases through said passage, an auxiliary electrode situated in proximity to the other end of said chamber, electrical power means to produce a current arc between one of said cathode and anode of said principal blowpipe and said auxiliary electrode, a connector made of electrical insulating material connected between said blowpipe and said chamber in a fluid-tight manner, said connector enclosing a region between said blowpipe and said one of said openings and comprising inlet means for introducing a selected fluid through said one of said openings into said central region of said chamber, and a low pressure source communicating with said annular passage of said blowpipe for drawing a portion of said selected fluid past said blowpipe cathode.

13. A furnace according to claim 12 wherein said low pressure source communicates with said annular passage through the intermediary of a conduit in which is disposed an adjustment valve for regulating the rate at which said portion of selected fluid is drawn past said blowpipe cathode.

14. A method for treating materials at high temperatures in a furnace comprising a rotatable chamber having an axial inlet opening and exterior heating means constituted by at least one plasma blowpipe having a cathode and an anode, a first circuit connecting said cathode and said anode including an electrical energy source and means for controlling the difference of potential between said electrodes, a second circuit connecting one of the electrodes of said blowpipe and a portion of said chamber, which method comprises rotating said chamber to subject the materials to be treated to a centrifugal force, positioning said blowpipe in front of said opening, inducing an arc between the cathode and the anode of said blowpipe through said first circuit to produce a first heating of said matrials, whereby a cavity of revolution lined with molten material is formed in the mass of said material due to the combined action of the centrifugal force and heating, causing an arc to be established between said chamber portion and said one of the electrodes of said blowpipe through said second circuit, and controlling the position, with respect to said material treated within said chamber, of the last arc formed, hence of its hottest zone, by said means for controlling said difference of potential.

References Cited
UNITED STATES PATENTS

| | | | |
|---|---|---|---|
| 2,863,738 | 12/1958 | Van Antwerp | 13—9 XR |
| 2,997,006 | 8/1961 | Grosse | 110—1 |
| 3,147,330 | 9/1964 | Gage | 219—121 XR |
| 3,257,196 | 6/1966 | Foex | 13—10 XR |

BERNARD A. GILHEANY, *Primary Examiner.*

H. B. GILSON, *Assistant Examiner.*